United States Patent
Tee et al.

(10) Patent No.: US 7,356,637 B2
(45) Date of Patent: *Apr. 8, 2008

(54) VIRTUAL IDE STORAGE DEVICE WITH PCI EXPRESS INTERFACE

(75) Inventors: Boon-Kuew Tee, Hsinchu (TW); Wee-Kuan Gan, Hsinchu (TW)

(73) Assignee: Phison Electronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/747,235

(22) Filed: May 11, 2007

(65) Prior Publication Data

US 2007/0208900 A1 Sep. 6, 2007

Related U.S. Application Data

(63) Continuation of application No. 10/906,934, filed on Mar. 14, 2005, now Pat. No. 7,225,289.

(51) Int. Cl.
*G06F 13/00* (2006.01)
(52) U.S. Cl. .................. 710/315; 710/313; 711/115
(58) Field of Classification Search ............... 710/313, 710/315; 711/115
See application file for complete search history.

(56) References Cited

U.S. PATENT DOCUMENTS

| | | | |
|---|---|---|---|
| 6,292,863 B1 * | 9/2001 | Terasaki et al. ............ 710/313 |
| 7,225,289 B2 * | 5/2007 | Tee et al. .................... 710/315 |
| 2005/0055481 A1 * | 3/2005 | Chou et al. ................... 710/52 |
| 2005/0120146 A1 * | 6/2005 | Chen et al. .................... 710/22 |
| 2005/0160218 A1 * | 7/2005 | See et al. ..................... 711/103 |
| 2006/0047880 A1 * | 3/2006 | Lindblom et al. .......... 710/305 |
| 2006/0149860 A1 * | 7/2006 | Diamant ..................... 710/15 |
| 2006/0168387 A1 * | 7/2006 | Gan et al. .................... 710/305 |
| 2006/0168391 A1 * | 7/2006 | Gan et al. .................... 711/103 |

* cited by examiner

*Primary Examiner*—Glenn A. Auve
(74) *Attorney, Agent, or Firm*—Jianq Chyun IP Office

(57) ABSTRACT

The present invention discloses a virtual integrated drive electronics (IDE) storage device with a peripheral component interconnect (PCI) Express interface. The storage device includes a microcontroller connected to a PCI Express connecting interface and a flash memory separately. The microcontroller includes a flash memory interface, a PCI Express interface and a virtual IDE module. The virtual IDE module includes an IDE host and an IDE device. When the host sends an instruction for storing or reading data to a flash memory, the instruction will be sent to and executed in the virtual IDE module. The data in the flash memory can be transmitted at a transmission rate up to the standard of an IDE device, and the host will consider the storage device as an IDE device instead of a PCI Express device only.

17 Claims, 2 Drawing Sheets

VIRTUAL IDE STORAGE DEVICE WITH PCI EXPRESS INTERFACE

CROSS-REFERENCE TO RELATED APPLICATION

This application is a continuation application of patent application Ser. No. 10/906,934, filed on Mar. 14, 2005 and now U.S. Pat. No. 7,225,289. The entirety of the above-mentioned patent application is hereby incorporated by reference herein and made a part of this specification.

BACKGROUND OF THE INVENTION

1. Field of Invention

The present invention relates to a virtual integrated drive electronics (IDE) storage device with a peripheral component interconnect (PCI) Express interface, and more particularly to a virtual IDE storage device that uses the PCI Express interface as a transmission interface.

2. Description of Related Art

As the science and technology of computers grows in a fast changing manner, a computer tends to be developed with powerful computational functions and a fast speed, and thus the clock of a central processing unit (CPU) is too fast, and the transmission rate of other peripheral equipments cannot catch up with the processing speed of the CPU at all. Even though the CPU continues enhancing its performance, the transmission rate of peripheral equipments cannot be improved much because the overall performance of a computer depends on the whole system. It is necessary to improve the whole computer architecture before the performance of a CPU can be maximized.

However, the data transmission rate depends on the transmission rate of a bus. To enhance the performance of a computer, related manufacturers usually improve the transmission rate of a bus. For example, the transmission rate of an integrated drive electronic (IDE) interface connected to a hard disk drive reaches 160 MB/s; the network line is upgraded from 10 MB/s to 1 GB/s; the transmission rate of the RS-232 is replaced by the 480 Mb/s of the universal serial bus (USB), and the present PCI with a transmission rate of 133 MB/s upgrades the transmission rate of its lane to 250 MB/s which is know as a new-generation peripheral component interconnect express (PCI Express). The PCI Express further supports a hot-plug control function. Therefore, the PCI Express is extensively accepted by users.

Further, the flash memory since its announcement gradually replaces the EEPROM or battery power memory in many portable device due to its charming features including low power consumption, non-volatility, shock resistance, and high-capacity storage. With the advanced semiconductor technologies, the storage capacity and transmission rate of a flash memory grow rapidly. The flash memory replaces traditional storage medium such as a hard disk drive in many applications, but most of the present storage devices made of flash memories use the universal serial bus (USB) or integrated drive electronics (IDE) interface as the transmission interface. The transmission rate of the USB and IDE interface are just 480 Mb/s and 160 MB/s respectively, and such transmission rates cannot catch up with the accessing speed of the flash memory. Therefore, the applications of the storage device made of this kind of flash memory is restricted by the USB or IDE interface of the host, and its performance cannot be maximized.

Further, a software developing system or a software program usually provides several environment interfaces that integrate editing, compiling, debugging, file management and execution. The environment interface lets programmers develop a majority of an application program, and thus the software executed at the host end is communicated by a specific environment interface and peripherals. A peripheral must have the environment interface of the host before the peripheral can execute an instruction transmitted from the host.

Therefore, using a bus with a faster transmission rate as a transmission interface to maximize the performance of a memory card is an important subject for manufacturers in the related field to make further improvements.

Therefore, it is desirable to provide a card reader that eliminates the aforesaid drawbacks.

SUMMARY OF THE INVENTION

The present invention has been accomplished under the circumstances in view. Therefore, it is a primary objective of the present invention to use the PCI Express as a transmission interface between a host and a storage device, and the storage device has a virtual IDE module capable of communicating with the host, such that the storage device can achieve the best transmission rate when accessing data in a flash memory, and the storage device also has the features of an IDE interface.

To achieve the foregoing objective, the storage device comprises a microcontroller, and the microcontroller is connected separately to a PCI Express bus in a host and flash memory, and the microcontroller has a flash memory interface, a PCI Express interface, and a virtual IDE module, such that if the host gives an instruction to a flash memory for storing or reading data, the instruction will be sent to the virtual IDE module and the execution of the instruction will be completed by the virtual IDE module. The data in the flash memory follows the instruction, and the flash memory interface and the PCI Express interface in the microcontroller converts the data into a data format acceptable to the flash memory or the PCI Express bus. The data is then sent to the host or the flash memory, such that the host can give instruction to the flash memory through the virtual IDE module for accessing data, and the data transmission rate can meet the transmission rate of the PCI Express standard without losing the feature of an IDE interface.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
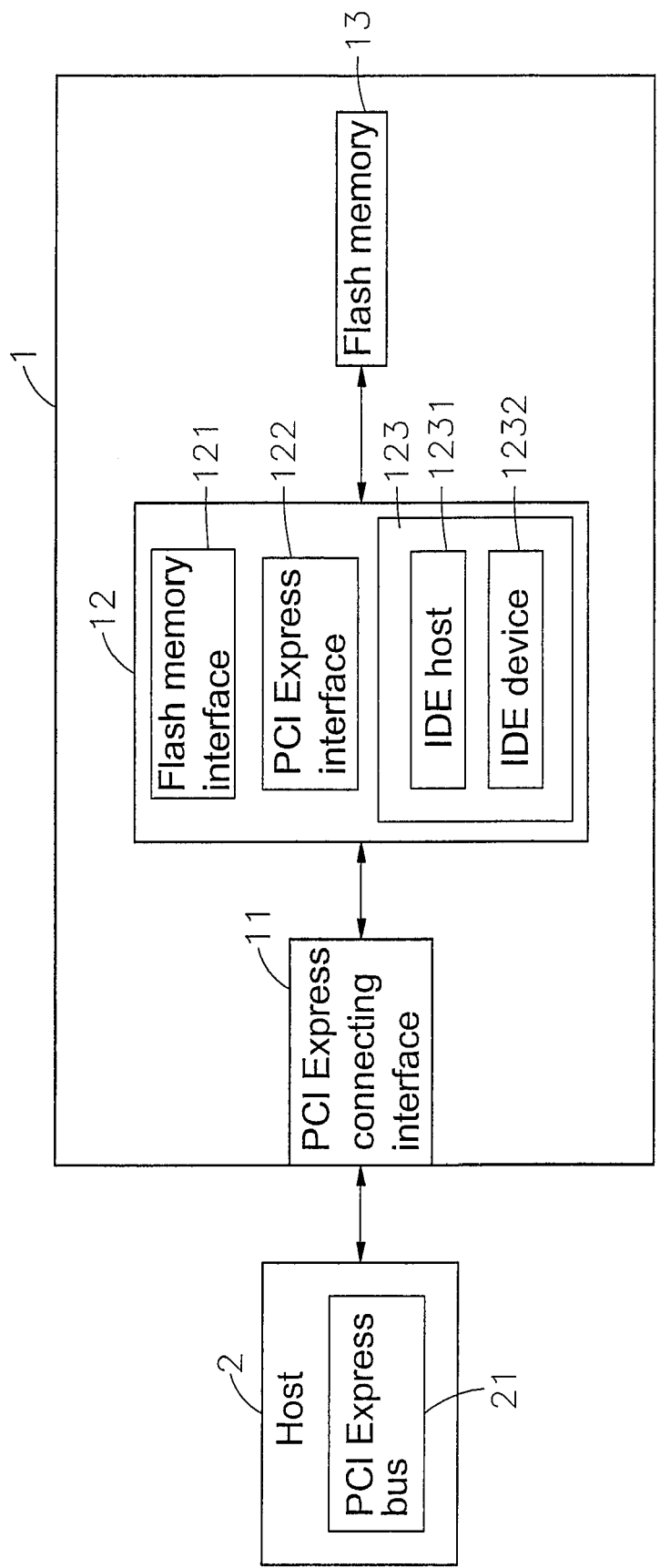
FIG. 1 is a block diagram according to a preferred embodiment of the present invention.

In FIG. 1, a storage device 1 of the present invention comprises a PCI Express connecting interface 11, a microcontroller 12 and a flash memory 13.

The PCI Express connecting interface 11 is provided for connecting to a PCI Express bus 21 of a host 2.

The microcontroller 12 includes a memory card interface 121, a PCI Express interface 122 and a virtual IDE module 123. The virtual IDE module 123 includes an IDE host 1231 and IDE device 1232, and the microcontroller 12 is connected to the PCI Express connecting interface 11. The virtual IDE module 123 is not physical, but it is virtual and simulated by a designer's firmware program.

The flash memory 13 is connected to the microcontroller 12.

When the PCI Express connecting interface 11 of the storage device 1 is connected with the PCI Express bus 21 of the host 2, the microcontroller 12 of the storage device 1 will declare to the host 2 that the storage device 1 is an IDE host, such that the host 2 will consider the microcontroller 12 as an IDE host, even though the host 2 remains communicating with the microcontroller 12 by the PCI Express architecture.

When the host issue an IDE saving instruction, the instruction will be sent to the IDE host 1231 of the virtual IDE module 123 of the microcontroller 2 first, and then the IDE host 1231 will send the instruction to the IDE device 1232, and the IDE device 1232 will complete the execution of the instruction. At that time, the data of the host 2 will be sent to the microcontroller 12 through the PCI Express bus 21 and the PCI Express connecting interface 11, and the flash memory interface 121 in the microcontroller 12 will convert the data into a data format acceptable to the flash memory 3, and the data is stored in the flash memory 3.

In addition, when the host 2 needs to read a data stored in the storage device 1, the IDE instruction will be sent to the IDE host 1231 of the virtual IDE module 123 in the microcontroller 12 first, and then the IDE host 1231 will sent the instruction to the IDE device 1232, and the IDE device 1232 will complete the execution of the instruction. At that time, the flash memory 3 will send the data to the microcontroller 12, and the PCI Express interface 122 in the microcontroller 12 will convert the data into a data format acceptable to the PCI Express bus 21, and then the data is sent to the host 2 through the PCI Express connecting interface 11 and the PCI Express bus 21.

Furthermore, the IDE instruction may be an ATA or Serial ATA format. Here, the ATA and Serial ATA are example for the IDE instruction, and therefore the scope of the present invention is not limited thereby.

As description above, when the host 2 reads or stores data to storage device 1, the data is read from or written into the flash memory 3 through the microcontroller 12, and the read or write instruction is executed and completed by the IDE host 1231 and the IDE device 1232 of the virtual IDE module 123. Therefore, the host 2 may identify the storage device 1 as an IDE storage device with a PCI Express.

When the host 2 issues an instruction without the data processing, the instruction is completed in the virtual IDE module 123, and the microcontroller 12 may not communicate with the flash memory 13.

Figure 2:
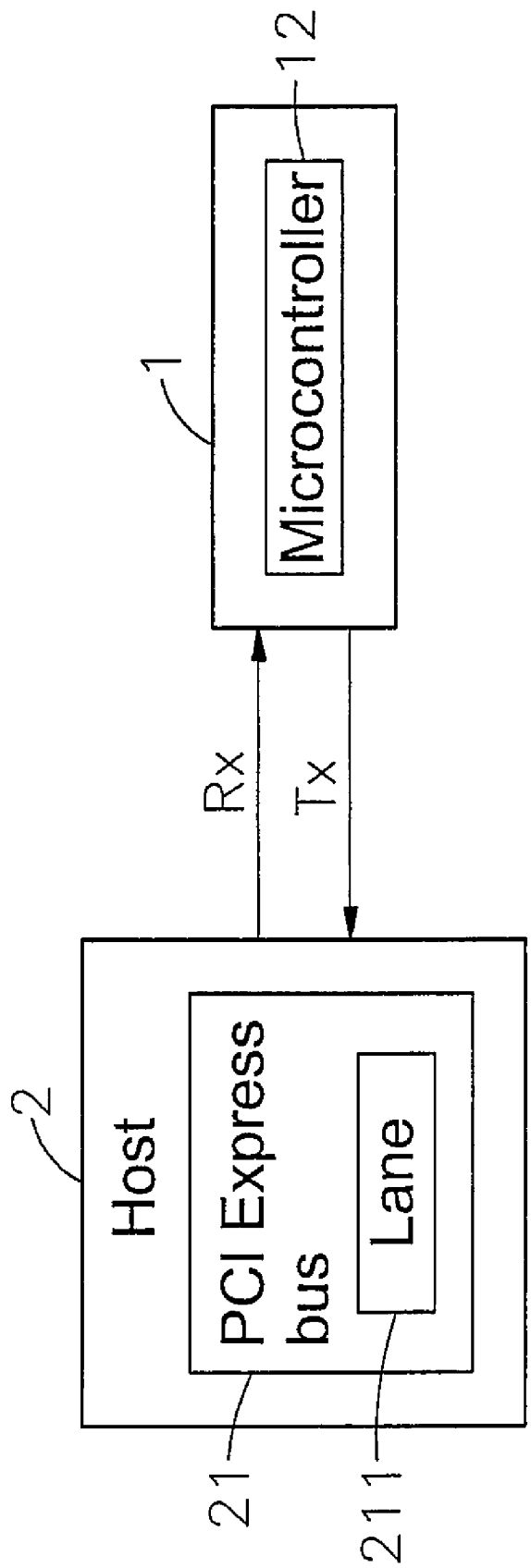
FIG. 2 is a schematic diagram of a data transmission according to a preferred embodiment of the present invention.

In FIG. 2, the host 2 and the storage device 1 has a lane 211 at a physical layer for transmitting data, and the lane 211 is comprised of a transmitting end (Tx) and a receiving end (Rx), and the quantity of the lanes 211 could be one or more.

Therefore, the virtual IDE storage device with the PCI Express interface according to the present invention can reduce the problems of the conventional art. The present invention uses an IDE host and an IDE device in the storage device to execute the instruction given by the host and also uses a PCI Express interface as the transmission interface between the host and the storage device, such that the data can be transmitted at a transmission rate that can meet the PCI Express standard, and the storage device can have the best transmission rate.

A prototype of virtual IDE storage device with PCI Express interface has been constructed with the features of FIGS. 1.~2. The virtual IDE storage device with PCI Express interface functions smoothly to provide all of the features discussed earlier.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flash storage device, comprising:
a microcontroller having a flash memory interface, a PCI Express interface, and a virtual IDE module capable of receiving an instruction given by a host, the virtual IDE module having an IDE host for receiving an IDE instruction given by the host and an IDE device for executing the IDE instruction, the virtual IDE module being implemented by a firmware program to be executed by the microcontroller;
a flash memory coupled to the microcontroller for storing data; and
a PCI Express connecting interface capable of being connected to a PCI Express bus disposed between the host and the flash storage device and provided for coupling the microcontroller to the host,
wherein when the flash storage device is connected to the host, the microcontroller notifies the host that the storage device is an IDE storage device, and
wherein when the host reads the data stored in the flash memory, the IDE instruction given by the host is sent to the virtual IDE module to be executed by the virtual IDE module, and the data in the flash memory is converted by the flash memory interface or the PCI Express interface of the microcontroller into a data forms acceptable by the PCI Express bus, and then the converted data is sent to the host.

2. The flash storage device as claimed in claim 1, wherein the IDE instruction complies with an ATA specification.

3. The flash storage device as claimed in claim 1, wherein the IDE instruction complies with a Serial ATA specification.

4. The flash storage device as claimed in claim 1, wherein the host and the flash storage device have only one lane at a physical layer for transmitting data, and the lane comprises a transmitting end (Tx) and a receiving end (Rx).

5. The flash storage device as claimed in claim 1, wherein the host and the flash storage device have more than one lane at a physical layer for transmitting data, and the lanes comprise a transmitting end (Tx) and a receiving end (Rx).

6. A controller, coupled to a flash memory and a PCI Express connecting interface, wherein the PCI Express connecting interface is capable of being connected to a PCI Express bus disposed between a host and a flash memory and provided for coupling the controller to the host, the controller comprising:

a flash memory interface, for interfacing with the flash memory;

a PCI Express interface, for interfacing with the PCI Express connecting interface; and a virtual IDE module capable of receiving an instruction given by the host, the virtual IDE module having a virtual IDE host for receiving an IDE instruction given by the host and an virtual IDE device for executing the IDE instruction, the virtual IDE module being implemented by a firmware program to be executed by the controller, wherein when the flash storage device is connected to the host, the controller notifies the host that the controller is an IDE host, wherein when the host reads data stored in the flash memory, the IDE instruction given by the host is sent to the virtual IDE module to be executed by the virtual IDE module, and the data in the flash memory is converted by the flash memory interface or the PCI Express interface of the controller into a data format acceptable by the PCI Express bus, and then the converted data is sent to the host.

7. The controller as claimed in claim 6, wherein the IDE instruction complies with an ATA specification.

8. The controller as claimed in claim 6, wherein the IDE instruction complies with a Serial ATA specification.

9. The controller as claimed in claim 6, wherein the host and the flash storage device have only one lane at a physical layer for transmitting data, and the lane comprises a transmitting end (Tx) and a receiving end (Rx).

10. The controller as claimed in claim 6, wherein the host and the flash storage device have more than one lane at a physical layer for transmitting data, and the lanes comprise a transmitting end (Tx) and a receiving end (Rx).

11. An apparatus, comprising:

a microcontroller having a flash memory interface, a PCI Express interface, and a virtual IDE module capable of receiving an instruction given by a host, the virtual IDE module being implemented by a firmware program to be executed by the microcontroller;

a flash memory coupled to the microcontroller for storing data; and a PCI Express connecting interface capable of being connected to a PCI Express bus disposed between the host and the apparatus and provided for coupling the microcontroller to the host;

wherein when the apparatus is connected to the host, the microcontroller notifies the host that the apparatus is an IDE storage device, wherein when the host reads the data stored in the flash memory, an IDE instruction given by the host is sent to the virtual IDE module to be executed by the virtual IDE module, and the data in the flash memory is converted by the flash memory interface or the PCI Express interface of the microcontroller into a data format acceptable by the PCI Express bus, and then the converted data is sent to the host.

12. The apparatus as claimed in claim 11, wherein the IDE instruction complies with an ATA specification.

13. The apparatus as claimed in claim 11, wherein the IDE instruction complies with a Serial ATA specification.

14. The apparatus as claimed in claim 11, wherein the host and the apparatus have only one lane at a physical layer for transmitting data, and the lane comprises a transmitting end (Tx) and a receiving end (Rx).

15. The apparatus as claimed in claim 11, wherein the host and the apparatus have more than one lane at a physical layer for transmitting data, and the lanes comprise a transmitting end (Tx) and a receiving end (Rx).

16. A method for interfacing between a flash storage device and a host, the flash storage device comprising a PCI Express connecting interface, a flash memory and a controller interconnected therebetween, the PCI Express connecting interface capable of being connected to a PCI Express bus disposed between the host and the flash storage device and provided for coupling the controller to the host, the method comprising:

notifying the host that the storage device is an IDE storage device when the flash storage device is connected to the host;

the host issuing an IDE saving instruction to the flash storage device, the IDE saving instruction being executed by the controller and data from the host for saving is converted by the controller into a data format acceptable to the flash memory and is stored in the flash memory; and the host issuing an IDE reading instruction to the flash storage device, the IDE reading instruction being executed by the controller, and the data in the flash memory is converted by the controller into a data format acceptable by the PCI Express bus, and then the converted data is sent to the host.

17. The method as claimed in claim 16, wherein a plurality of IDE instructions issued by the host are executed by a virtual IDE module being implemented by a firmware program in the controller.

* * * * *